United States Patent
Agarwal et al.

(10) Patent No.: US 9,977,824 B2
(45) Date of Patent: May 22, 2018

(54) SYSTEM AND METHOD FOR CREATING STRUCTURED EVENT OBJECTS

(71) Applicant: Tata Consultancy Services Limited, Mumbai, Maharashtra (IN)

(72) Inventors: Puneet Agarwal, Noida (IN); Rajgopal Vaithiyanathan, Uttar Pradesh (IN); Guatam Shroff, Uttar Pradesh (IN)

(73) Assignee: Tata Consultancy Services Limited, Mumbai (IN)

( * ) Notice: Subject to any disclaimer, the term of this patent is extended or adjusted under 35 U.S.C. 154(b) by 839 days.

(21) Appl. No.: 14/401,931

(22) PCT Filed: Mar. 22, 2013

(86) PCT No.: PCT/IN2013/000192
§ 371 (c)(1),
(2) Date: Nov. 18, 2014

(87) PCT Pub. No.: WO2013/171758
PCT Pub. Date: Nov. 21, 2013

(65) Prior Publication Data
US 2015/0161237 A1 Jun. 11, 2015

(30) Foreign Application Priority Data

May 18, 2012 (IN) .................. 1529/MUM/2012

(51) Int. Cl.
*G06F 7/00* (2006.01)
*G06F 17/30* (2006.01)
(Continued)

(52) U.S. Cl.
CPC .. *G06F 17/30607* (2013.01); *G06F 17/30705* (2013.01); *G06F 17/30864* (2013.01);
(Continued)

(58) Field of Classification Search
CPC ......... G06F 17/30705; G06F 17/30864; G06F 17/30607; G06F 17/30053; H04L 12/58; H04L 29/08
See application file for complete search history.

(56) References Cited

U.S. PATENT DOCUMENTS 7,739,314 B2 * 6/2010 Datar .................. G06Q 30/02
707/803
7,899,769 B2 * 3/2011 Jones .................. G06F 17/2785
706/45
(Continued)

FOREIGN PATENT DOCUMENTS

WO      WO2011/117593      *   9/2011

OTHER PUBLICATIONS

Thomas Moser et al.; Semantic Event Correlation Using Ontologies; OTM 2009; Part II, LNCS 5871, pp. 1087-1094; Spring-Verlag Berlin Heidelberg 2009; 8 pages.
(Continued)

*Primary Examiner* — Daniel Kuddus
(74) *Attorney, Agent, or Firm* — Shumaker, Loop & Kendrick, LLP

(57) ABSTRACT

Disclosed is a system and method for converting a voluminous stream of unstructured short text messages into event-objects of specific event type that may be of potential interest to users at far away locations. The method of structuring involves detecting long tail of events in spite of their sparsity. This is followed by extracting and correlating detected short text messages that describe same event type to create structured event objects.

14 Claims, 7 Drawing Sheets

(51) Int. Cl.
*G06Q 10/10* (2012.01)
*G06Q 50/00* (2012.01)
*H04L 12/58* (2006.01)
*H04L 29/08* (2006.01)

(52) U.S. Cl.
CPC ............ *G06Q 10/10* (2013.01); *G06Q 50/01* (2013.01); *H04L 51/12* (2013.01); *H04L 51/32* (2013.01); *H04L 67/02* (2013.01)

(56) References Cited

U.S. PATENT DOCUMENTS

| | | | |
|---|---|---|---|
| 8,010,664 | B2 | 8/2011 | Firminger et al. |
| 8,060,582 | B2 * | 11/2011 | Bliss .................. G06F 17/3087 348/113 |
| 8,676,965 | B2 | 3/2014 | Gueta et al. |
| 9,098,328 | B2 * | 8/2015 | Lam ........................ G06F 9/542 |
| 9,158,576 | B2 * | 10/2015 | Lam ........................ G06F 9/542 |
| 9,304,809 | B2 * | 4/2016 | Lam ........................ G06F 9/542 |
| 2007/0038659 | A1 * | 2/2007 | Datar ............... G06F 17/30867 |
| 2007/0143300 | A1 | 6/2007 | Pisa et al. |
| 2007/0223699 | A1 * | 9/2007 | Jones .................. G06F 17/2785 380/262 |
| 2009/0048927 | A1 | 2/2009 | Gross et al. |
| 2010/0106801 | A1 * | 4/2010 | Bliss .................. G06F 17/3087 709/219 |
| 2011/0029657 | A1 * | 2/2011 | Gueta .................. H04L 43/026 709/224 |
| 2011/0137845 | A1 | 6/2011 | Ward et al. |
| 2011/0207482 | A1 | 8/2011 | Shamma et al. |
| 2011/0209159 | A1 | 8/2011 | Baratz et al. |
| 2011/0117593 | A1 | 9/2011 | Thompson et al. |

OTHER PUBLICATIONS

Eduardo J. Ruiz. et al.;"Correlating Financial Time Series with Micro-Blogging Activity"; dated Feb. 8-12, 2012; 9 pages.
Vivek K. Singh et al.; "Event Analytics on Microblogs"; Web Science Conference; dated Apr. 26-27, 2010, Raleigh, NC, USA, 4 pages.
Amanda Lee Hughes et al.; "Twitter Adoption and Use in Mass Convergence and Emergency Events"; Proceedings of the 6th International ISCRAM Conference—Gothenburg, Sweden; dated May 2009; 10 pages.
Dario Colazzo et al.; "Linear Inclusion for XML Regular Expression Types"; Hong Kong, China; Hong Kong, China, dated Nov. 2-6, 2009; 10 pages.
Edward Benson et al.; "Event Discovery in Social Media Feeds"; dated 2011; 10 pages.
Lim Yung Hui; "8 Excellent Tools to Extract Insights from Twitter streams"; dated Mar. 3, 2009; URL: http://www.greyreview.com/2009/03/03/8-excellent-tools-to-extract-insights-from-twitter-strearns/; 2 printed pages.
Ana-Maria Popescu et al.; "Extracting Events and Event Descriptions from Twitter"; WWW 2011; dated Mar. 28-Apr. 1, 2011; Hyderabad, India; 10 pages.
Sarma, Anish Das et al.: "Dynamic Relationship and Event Discovery"; WSDM'11; Feb. 9-12, 2011, Hong Kong, China; 10 pages.
Knut Stolze, Ph.D.; "Basic text indexing with DB2 index extensions, Create customized hash indexes and inverted text indexes for strings"; IBM Germany Research and Development IBM; dated May 15, 2008; 15 pages.
Mário Cordeiro; "Twitter event detection: combining wavelet analysis and topic inference summarization" Faculdade de Engenharia da Universidade do Porto; dated 2012; 16 pages.
Bongwon Suh et al.; "Want to be Retweeted? Large Scale Analytics on Factors impacting Retweet in Twitter Network"; Palo Alto Research Center, Inc., Palo Alto, CA; dated 2010; 8 pages.
International Search Report for International Application No, PCT/IN2013/000192; dated Nov. 18, 2014; 3 pages.
Written Opinion of the International Searching Authority for International Application No. PCT/IS2013/000192; dated Jan. 21, 2014; 7 pages.

* cited by examiner

| ENTERPRIZE INFORMATION FUSION | | |
|---|---|---|
| FIND IN FACTORY | | |
| 261 | Billinghay, Lincolnshire, England, United Kingdom | Fran_Frith was all over. Bill CEVH suscpect him for http://bit.ly/kuyBq |
| Spam: X ✓<br>Train :X ✓ | Illegal alcohol factory, factory in Lincolnshire | |

Figure 4

SYSTEM AND METHOD FOR CREATING STRUCTURED EVENT OBJECTS

CROSS-REFERENCE TO RELATED APPLICATIONS AND PRIORITY

The present application claims priority from Indian Patent Application No. 1529/MUM/2012 filed on May 18, 2012 and from PCT/IN2013/000192 filed on Mar. 22, 2013, the entirety of which is hereby incorporated by reference.

FIELD OF THE INVENTION

The present invention generally relates to a system and method of creating real time structured event objects and, more particularly, to an autonomic system and method of detecting stream of unstructured short text messages from social networking platforms and processing them to create structured event objects.

BACKGROUND OF THE INVENTION

In the current networking environment, Twitter has emerges as a rich source of local news from around the world, with over 340 million tweets reported each day across 200 countries. Many events of local importance are first reported on Twitter, including many that never reach news channels. Further, there are often only a few tweets reporting each such event, in contrast with the larger volumes that follow events of wider significance. Even though such events may be primarily of local importance, they can also be of critical interest to some specific but possibly far flung entities.

For example, any business enterprise can potentially be affected by events that impact any entity in its eco-system, such as customers, partners, governments, competitors, etc. Considering an instance of a fire in the factory of a remotely located supplier half-way around the world, can disrupt an enterprise's supply-chain and cause significant delays and losses. Especially in today's globalized world, it is becoming increasingly important for an organization to continuously sense the external world for events on potential interest, as well as extract sufficient information about such events so as to assess their possible impact on its affairs.

Along with the increasing utilization of social media, Twitter in particular has become a rich source of breaking news, including news that, is local and possibly of limited interest to a wider global audience. Such events may in fact never make it to any news channel, certainly not a global one. At the same time, taking an example of a fire in a supplier's factory, many such events may indeed be of interest to specific but far away entities. Detecting such events amongst the nearly 340 million tweets per day is equivalent to 'finding a needle in haystack'. Such events need to be sensed from a stream of unstructured short-text messages (tweets) arriving at a rate of tens of messages per second. It has to be acknowledged that detection of local news events nevertheless may be of tremendous operational value when correlated with the internal operations and transactions of even a far-flung enterprise.

Next, since the number of messages per event is small, their detection by observing trends on keywords, as prevalent in most techniques for event detection from Twitter is inconceivable. Most of the approaches used in the art assume that many tweets arrive on the same event so that it can be detected by a rising trend on a keyword. Another architectural proposition by Shroff, Agarwal and Dey in 2011 aims to achieve information fusion in the enterprise context called 'Enterprise Information Fusion'. However, one of the pre-requisites for such a system, as also mentioned therein, is the ability to detect structured event-objects containing precise information about each event which has always remained a challenging task.

Recent publications on twitter event detection can be segregated based on (a) nature of events or (b) the detection techniques used. Events can be very specific such as natural calamities, accidents, sports related, marketing events or a cultural extravaganza. For example, Sakaki et al., show how to detect earthquakes (Sakaki, Okazaki, and Matsuo 2010). On the other hand, events can be generic, often referred to as 'breaking news' as discussed by Phuvipadawat et al. (Phuvipadawat and Murata 2010), as also by Weng et al. in their paper (Weng and Lee 2011). Amongst the techniques used, one approach is to detect events from clustered tweets as discussed in (Becker and Gravano 2011), whereas (Weng and Lee 2011) proposes clustering followed by feature extraction. However, since each tweet is very short it usually covers only one aspect of an event (e.g., its location, or severity etc.) and therefore clustering tweets based on word-similarity results in only those describing the same aspect of the event being grouped together.

In the former approach that requires clustering of the tweets first, one has to wait for more tweets to arrive before detecting an event. Similarly the techniques used therein would therefore fail to detect sparsely reported events, which can be of critical importance. This demands acute need of a more improvised classification that can detect such sparsely reported events, effectively discard irrelevant tweets and consequently improve processing efficiencies. To be fair, none other related work has ever focused on capturing and processing sparsely reported events for information extraction that can be vital to any enterprise.

Another challenge usually faced in the analysis of these tweets is that of correlation across multiple messages. If different words are used to describe the same event, correlation between messages through word-to-word similarity does not work no matter what technique is used. Correlation requires the extraction of properties/concepts (e.g. time of occurrence, location, etc,) to create a stream of structured event-objects. Popularly known techniques of information-extraction fail to give good results in this particular scenario because of the informal and abbreviated language usually used tweets.

Furthermore, Natural Language processing technique for information extraction from well-formed English prose has been fairly successful (Finkel, Grenager, and Manning 2005), (Kristina et al. 2003). However, information extraction from the informal language used in Twitter has still not been possible with similar level of accuracy.

Finally, even after one identifies potential event-objects, many of these still represent the same real world event so it is important to further correlate such potential events and merge them.

In the light of foregoing, there exists a need for a system that can consume stream of sparsely reported tweets of different types and convert them to event-objects for specific event types that can represent the events of interest to an enterprise.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosures. It is also to be understood that the terminology used in the description is for the purpose of describing particular versions or embodiments only, and is not intended to limit the scope of the present invention which will be limited only by the appended claims. The principle object of the present invention is to provide an automated system and a method of creating structured event objects of specific event type reported sparsely from a stream of unstructured text/messages.

Another object of the present invention is to provide an automated system and method of creating a common event structure capable of representing different types of events that may be of potential interest for an enterprise.

Yet another object of the present invention is to provide one event object per real world event such that one such event object contains all the reported details of the event-of-interest.

Another significant object of the invention is to provide a system capable of detecting and converting sparsely reported events into specific event objects that can be fused with data internal to an enterprise in order to assess their potential impact and raise real time alerts, if required.

It is another object of the present invention to provide a system and method that generate reports to assist an enterprise in planning, such as choosing suppliers or areas of operation.

Yet another object of the present invention enables the system in utilizing different types of event objects, so detected, in multiple potential applications like tracking competitor promotions in to fine-tune marketing and sales, or monitoring consumer complaints in product-service domains.

Other object of the present invention is to provide a system that is empowered to rank the source for their trustworthiness thereby enhancing the probability of consolidating more credible information.

The present invention envisages a system and method of detecting long tail of events reported sparsely, extracting and correlating information from multiple tweets describing the same event to create a stream of structured event objects.

An embodiment contemplates a method of deriving at least one structured event object from a stream of unstructured text that is associated with plurality of sparsely reported events, the events being specific to an event type. The method comprising the steps of:

detecting one or more potential events by first filtering the unstructured text using regular expression filter, followed by classifying the filtered text based upon a set of recognized features;

computing a textual similarity score for incoming text stream by comparing each of the incoming text with potentially matching neighboring text stream for textual similarity, and establishing a correlation thereof whenever textual similarity score is above a predetermined threshold score, for obtaining one or more partial events; extracting conceptual and other related information from the correlated partial events and associated metadata thereof; and finally deriving structured event objects by establishing a correlation between the partial events based on, at least in part, the extracted conceptual and other information of the corresponding partial events.

Another embodiment contemplates a system to derive at least one structured event object from a stream of unstructured text associated with plurality of sparsely reported events, wherein the system comprises of: a processor, a memory device coupled to the processor and configured to provide the processor with instructions the instructions being executable by modules hosted on the processor, the modules including;

a detection module which is adapted to detect one or more potential events, where the events gets filtered and classified for transmission to a correlation module;

the correlation module is configured to generate one or more partial event by establishing correlation between the classified text bearing textual similarity, which remains communicably connected to an information extraction module that is configured to extract one or more semantic properties of the partial events; the semantic correlation module that also remains responsively connected to an information extraction module for establishing correlation between the partial events. Thereafter at least one structured event object is obtained by such semantic correlation based on, at least in part, conceptual and other associated information extracted by the information module from the partial events and associated metadata thereof. The system also includes a display unit presenting real time view of the structured event objects.

BRIEF DESCRIPTION OF THE DRAWINGS

The foregoing summary, as well as the following detailed description of preferred embodiments, are better understood when read in conjunction with the appended drawings, wherein like elements are given like reference numerals. For the purpose of illustrating the invention, there is shown in the drawings example constructions of the invention; however, the invention is not limited to the specific methods and system disclosed. In the drawings:

FIG. 4 is a display output module displaying real time view of structured event object, in accordance with one of the embodiments of the present invention.

DETAILED DESCRIPTION OF THE INVENTION

Figure 1:
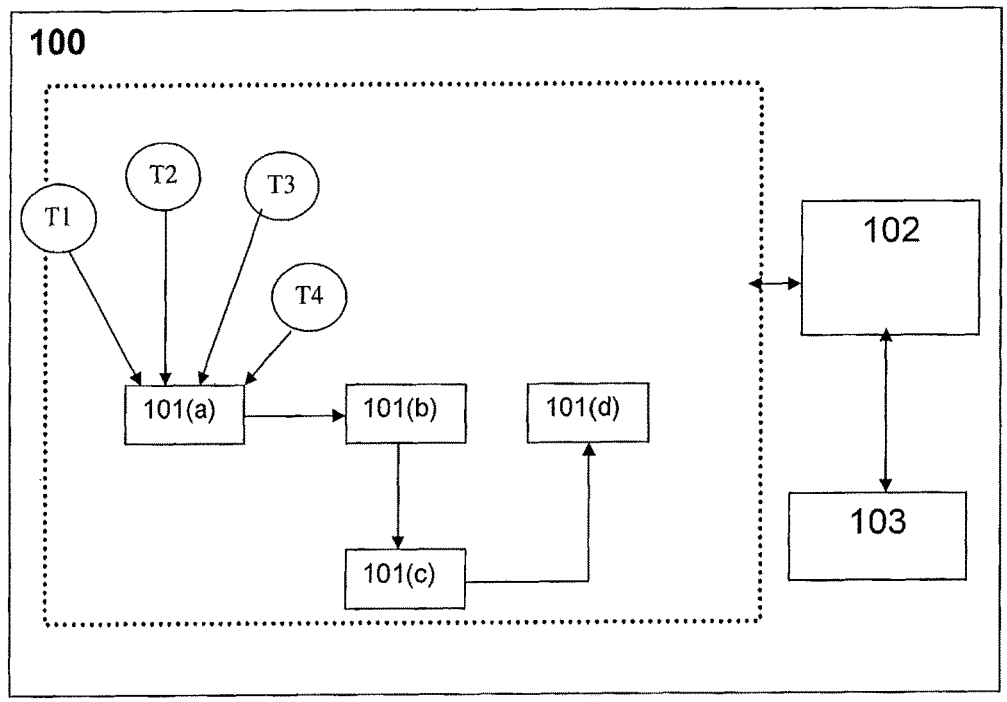
FIG. 1 depicts a block diagram showing the overall architecture of the system in accordance with one of the preferred embodiments of the present invention.

The disclosed method and system for creating structured event objects will now be discussed in further detail below.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

The disclosed embodiments are merely exemplary of the invention, which may be embodied in various forms. Software programming code, which embodies aspects of the present invention, is typically maintained in a permanent storage such as a computer readable medium. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communication network, such as the Internet. Further, a computerized method refers to a method whose steps are performed by a computing system containing a suitable combination of one or more processors, memory means and storage means.

Prior to a description of the embodiments of the present invention, it shall be understood that the term "classification" as used herein is intended to be interpreted as in context of Machine Learning of Artificial Intelligence.

Broadly, the present invention contemplates an automated system and a method for creating event objects, for specific event types, from a stream of short un-structured text, say for example, tweets. Further, the invention presents a generic logical architecture for creation of event-objects from a stream of tweets which retains high level of accuracy due to continuous learning process through boosting.

In one of the embodiments of the present invention, the sparsely discussed news events from a voluminous stream of Twitter messages are detected. Since each tweet is very short, say usually of 140 characters, it usually covers only one aspect of an event. For example, news of a fire broke out may report only one aspect of the event which may textually differ from other news item(s) reported for the same event. While one news item may emphasis more upon the location and time, the others may describe severity of the event, cause, remedial measures taken or compensation promised from authorities. In a spate of updated news item(s), matching the tweets reporting the same news item based merely on a simple textual match may not possibly retrieve best results. Alternately, clustering tweets based on word-similarity results in only those describing the same aspect of the event being grouped together while rendering the possibility of detecting many important tweets reporting another significant aspect of an event type or even describing the events in different words, as minimal. This poses a formidable challenge in consolidating all tweets reporting differential aspects of an event. The present invention, therefore first classify each tweet using a supervised classifier as 'reporting-event' or 'not-reporting-event', thereby discarding irrelevant tweets, and then group the positive tweets based on textual similarity by employing Locality Sensitivity Hashing technique. Next, the grouped tweets are assessed for their conceptual information-temporal aspects, spatial aspects, descriptive aspects and generative aspects by deploying information extraction techniques, based upon which semantic correlation is established between the conceptually similar tweets to generate a final and unique event-object.

Thus, as compared to related works those usually rely primarily on clustering, the present system and method combine the use of LSH, a supervised classifier, and post-information-extraction clustering.

The proposed system and method have been validated by experimenting the process upon millions of tweets monitored over several months. Statistically, a success rate in the range of 80% has been achieved in the process of event detection and 76% on event-correlation. Further, the present invention has also achieved reduced tweet comparisons by 80% using Locality Sensitivity Hashing (LSH) technique.

One embodiment of the present invention, apart from detection and conversion of unstructured short text messages into event objects, provides a mechanism of report generation based on statistical pattern analysis.

Referring now to FIG. 1, a block diagram depicting modular components of the system is shown. The system 100 broadly comprises of a processor 101, a memory device 102 that remains coupled to the processor and is configured to provide the processor with instructions. These instructions are being executable by modules hosted on the processor. The various modules as shown in FIG. 1, includes a detection module 101(a) for detecting tweets reporting occurrence of any event over a communicating network. These tweets are shown as $T_1, T_2, T_3, T_4 \ldots T_n$, and shares information with the processor over a network that may include and further expanded to many networks like a wide area network (WAN), an intranet, an extranet, a wireless network, or the Internet.

a message correlation module 101 (b) that is responsible for establishing correlation between the short-text messages of multiple tweets thereby generating a set of partial events. Also, the module 101(b) is responsively connected to an information extraction module 101(c). The module 101(c) extracts conceptual and other associated information from the partial events and associated metadata which is then utilized by a semantic correlation module 101(d) to generate a structured event object. The system further comprises of a display unit 103 for presenting real time view of the structured event objects.

Figure 2:
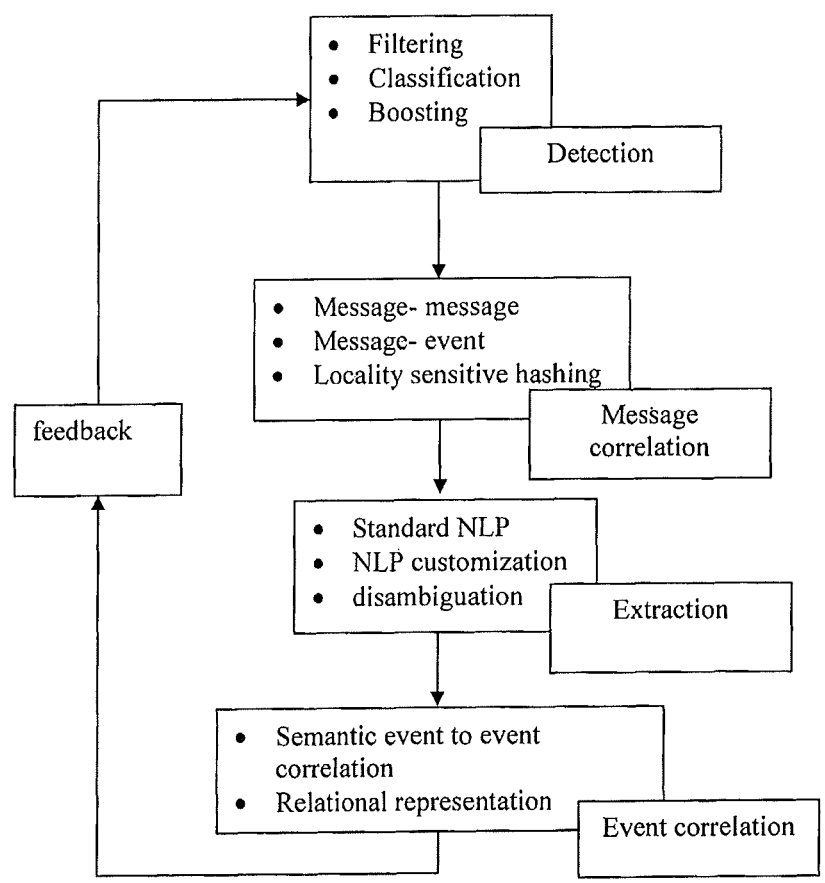
FIG. 2 is a logical representation of the process flow in accordance with one of the disclosed embodiments of the present invention.

Next, FIG. 2 illustrates a four step process starting with detection of a candidate-message that reports the occurrence of an event. Such messages are then passed on to the correlation module 101(b) where a text matching algorithm correlates these with other messages. Further, in the extraction module 101(c) pre-defined informational aspects are extracted from each cluster of tweets. Finally, before storing a potential event-object in the database, each potential event-object is merged with others based on key properties such as time-of-occurrence and location, hereon referred to as "Event to Event Correlation" by a semantic correlation module 101(d).

One embodiment of the present invention provides a structured event object creating system and method that is suitable for, but not limited to, applications that can impact enterprises' supply chain such as fire or a labor strike in a remote factory. It shall however, be acknowledged that the present approach is quiet general and is also being applied to a large variety of events.

For the illustration purposes, the experimental results have been reported for two types of events: Fire-in-Factory and Labor-Strike, but the invention has also been tested to work on various platforms vis-à-vis capturing marketing events such as product promotions, product launches and the like.

Fire-in-Factory events cover accidental fire in factories anywhere in the world and a Labor-Strike event refers to a situation when employees of an organization refuse to work in order to pressurize management to agree to their demands.

The system and method is however generic and not limited to any event type.

Event Detection:

Each tweet is a short-text message as posted by any of the millions of twitter users, who could be individuals or organizations. About 3000 tweets are posted per second in Twitter; however a subset of these tweets can be obtained on a filtered-stream (usually referred to as Garden-Hose). These filtered streams of tweets containing all potential tweets which could report the occurrence of an event are referred as event tweet-stream. For example, Filter-words used for Firein-Factory tweet-stream are {"Fire", "Blaze", "Factory", "Plant", "Mill"}. Likewise words used for Labor-Strike are {"Strike", "Union", "Labor", "Labour", "Staff", "Management", "Workers", "Employee"}. Thereby obtained are all the tweets that contain any of the filter-words. On an average such a stream produces 2 tweets per second is obtained. In particular, for fire-in-factory a mean of 122 k tweets per day with 13 k as standard-deviation is obtained.

Out of almost one hundred thousand tweets obtained through an event tweet-stream in a day, about 50-500 tweets are usually observed to be reporting occurrence of an event. To detect such messages by the detection module 101(*a*), a two step process is used. The first step is to filter or reject tweets by a filtration module that follow a specific pattern using regular expressions, and the second step is supervised classification and boosting that is realized in a classification module.

To figure out text-patterns which could be used to define the required regular expressions, certain classes of tweets are identified while preparing the training-set for second step. Such tweets usually represent a domain specific aspect and use similar words as those reporting the event but do not in fact report occurrence of an event. For instance: in the tweet stream for labor-strike events often contains tweets that talk about the voting process, and never report occurrence of labor-strike. Such tweets are observed to contain the word "vote". In case of both fire-in-factory and labor-strike about 80-90% of messages can be discarded through this step.

The regular-expression filter however fails to discard messages such as "If I take leave one more time, my boss would definitely fire me from the factory". Therefore two choices of supervised classification techniques are used for experimentation: Naive-Bayes-Classifier and Support Vector Machines. Unlike the existing arts, every tweet is classified into one of the two categories—those that report occurrence of an event (Ham) and those that do not (Spam). This approach is believed to discover more aspects of the same event and also reduces chances of missing an event altogether. Next, an overview of features extracted for classification is presented along with the summary of various techniques adopted:

Feature Set 1: Parse every tweet with Stanford Named Entity Recognition (NER) which annotates proper-names for organizations, locations and people, in a given text. Occurrences of location, organization or person are taken as features. Similarly occurrences of a URL in the tweet are also taken as a feature.

Feature Set 2: Check for occurrence of numbers, associate every number with a range, and identify every such range as a feature.

Feature Set 3: Having removed pre-configured stop-words and applying porter Stemmer all remaining words of every message are recognized as features.

Naive-Bayes-Classifier: Every message is assumed to contain k of the total N features i.e. $X_a=\{x1; x2; x3; \ldots, xk\}$. Here $X_a$ represents a message. Then $P(x_i/w_j)$ the probability of occurrence of a feature in each of the categories from the training-set is calculated. Then calculating $P(w_j/X_a)$ by summing the contribution of each feature in a message on Log scale gives the decision boundary.

Support-Vector-Machine: When input data is not found linearly separable, i.e., does not have a linear decision hyper-surface, it can be projected onto higher dimension system through a kernel function. SVM then finds a decision hyper-surface and support vectors in higher dimensions. The polynomial kernel function is used with default parameters as available in the open-source package Weka. An application displaying all the events extracted through the entire process for user's review is created. The users then provide feedback as to whether the detected event is indeed a real event or not. Such feedback is used to augment the training set on continuous basis. It has been observed that continuous augmentation of the training set improves classification accuracy event on future tweets, which is corroborated by the experimental results, discussed in the following section. Approximately 80% of the tweets are classified correctly and about 8% of tweets are False-Negatives, i.e. tweets which actually report occurrence of an event are classified as Spam. During further analysis of these tweets it is observed that only about 1-2% of the events are totally missed by this framework and most of the missed tweets did not contain worthwhile information (location, factory-name etc.) about the event to reason about further.

Message to Message Correlation:

As mentioned earlier, each tweet usually describes only one aspect of an event. Several tweets reporting the same event may contain more information about the event. It is observed that as time passes newer tweets with the latest information about an event begin appearing. It is therefore important to correlate and cluster tweets reporting aspects of the same event to get comprehensive view of the event. Therefore a mechanism for message-to-message correlation is deployed in the correlation module 101(*b*). Tweets can potentially arrive at a high frequency. If a new tweet is naively compared with every tweet of last few hours, this could lead to a bottleneck, especially if the rate at which pair wise message-to-message correlation is possible cannot match the arrival rate of newer tweets. If each word is considered as a dimension, a very high dimensional similarity search problem emerges. Therefore, Locality Sensitive Hashing (LSH) technique is employed to discover potentially similar tweets significantly faster than, say exhaustive pair wise comparisons.

Figure 3:
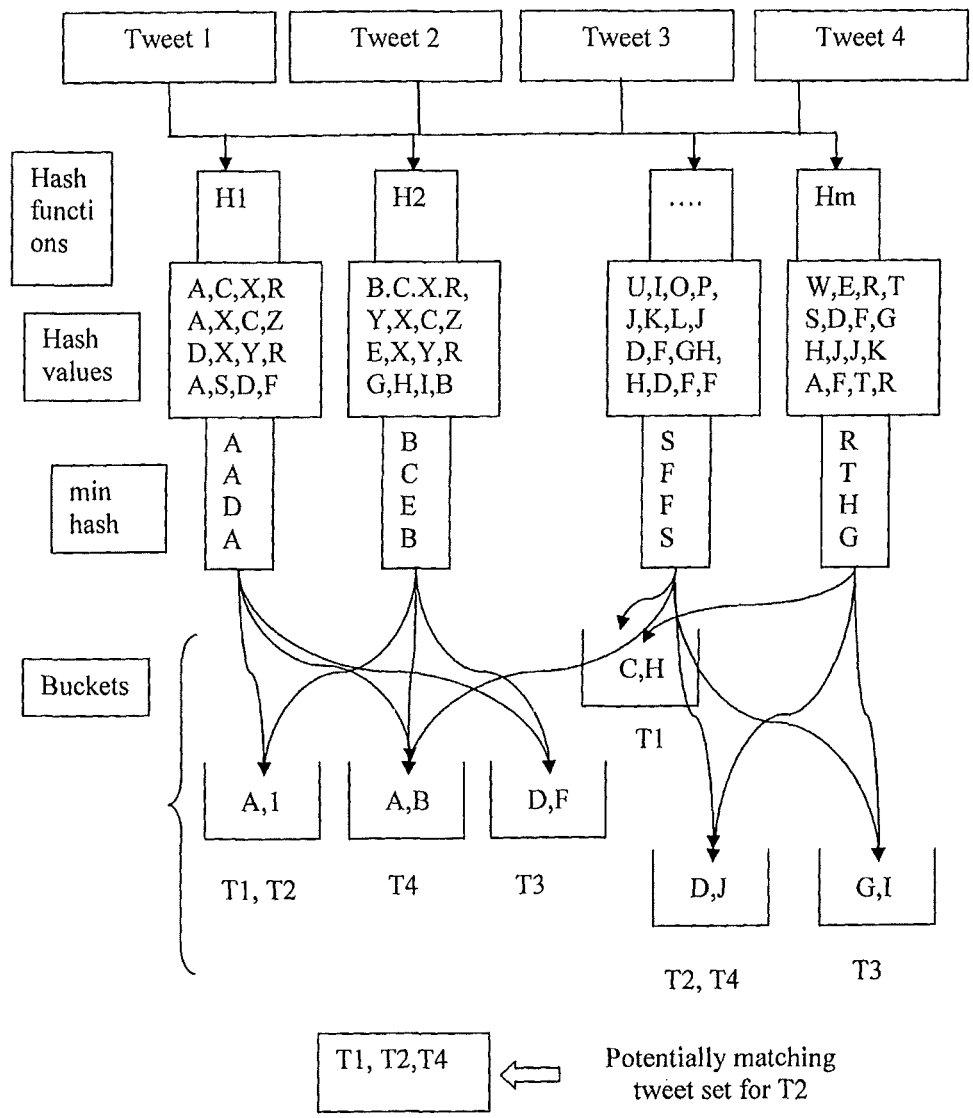
FIG. 3 is a schematic representation of a LSH technique as utilized for establishing correlation between the texts, in accordance with one of the disclosed embodiments of the present invention.

FIG. 3 describes implementation of Locality Sensitive Hashing. Here every tweet is considered as a collection of k words $\{W0; W1; W2; W3; \ldots; Wk\}$. Every unique word is called a feature and taken as a dimension in N-dimensional space, indicating N unique words in the corpus. Next, m hash-functions are used which are permutations over the set of words. Each word ($W_j$) is then mapped to a unique hash value $h_i(W_j)$. The lowest hash-value over all the words contained in a tweet is termed as the minhash value ($M_i$) for that hash-function and tweet. Therefore, $\text{minhash} M_i = \min\{h_i(W1); h_i(W2); h_i(W3); \ldots; h_i(Wk)\}$. A collection of such minhash values is called minhash signature of that tweet i.e. $S_t=\{M1; M2; \ldots; Mm\}$. The probability of two tweets sharing the same minhash value is the Jaccard similarity between the two tweets. The Jaccard similarity is computed as the ratio of the number of common words and number of unique words in two tweets.

$$p(M_{i(T1)} = M_{i(T2)}) = \frac{|T_1 \cap T_2|}{|T_1 \cup T_2|}$$

Now, r (where r≤m) random hash-functions are chosen and minhash values corresponding to this choice of hash functions is picked against every tweet. For every unique combination of such a set of minhash values a bucket is created. Next b combinations of random hash-functions are chosen, and for every tweet b buckets are created each having r minhash values corresponding to the chosen r hash-functions. However, similar tweets may share some of the buckets, i.e., for a
choice of r hash-functions, Tweet1 and Tweet2 create the same set of r minhash values {M1; M2; : : : ; Mr}. Given the Jaccard similarity p, the probability of two tweets having at least one common bucket will be $1-(1-p^r)^b$. Thus these two tweets will become potential matches. Values of m; r and b are tuned for optimal results. In the present implementation, a total of m=16 hash-functions, comprising of b=8 buckets of r=2 random hash-functions each are used.

Next is to establish message to message correlation and grouping. LSH is used on a stream of tweets to cluster the incoming messages together based on textual similarity: Every tweet goes into b buckets. However some of these b buckets would have been pre-created for previous tweets and a few new buckets may also get created for the incoming tweet, depending on how similar it is with prior tweets. Tweets falling in the same bucket are assumed to be potentially matching. The set of unique tweets co-occurring in all those b buckets form the set of all potentially matching tweets as shown in FIG. 3 with rectangular bucket. The incoming tweet is then compared for word-to-word similarity with each of the messages in the potentially matching tweets set. Tweets found 55% to 75% similar with the incoming tweet are considered to be matching and the incoming tweet is associated to all the corresponding events of matching tweets. It is observed that only 6% of the incoming tweets get associated to more than one event. If the incoming tweet does not match with any of the tweets in its potentially matching tweets set it will become first tweet of a new event. Finally, if there is no further update on an event for a day the matter is assumed to have subsided and therefore purge the buckets which don't attract any new tweets for 24 hours, thereby saving storage space. The tweets bunched together in the above step are referred as partial-events, because often more than one partial event is created for a single real world event. Different partial events highlight different aspects of the real world event and should therefore be merged. This process is termed as event-to-event correlation.

Information Extraction:

After detection and correlation, tweets that report occurrence of an event with similar tweets bunched together as partial-events. Before proceeding to create event objects from these partial-events, information extraction from all the tweets associated to a partial-event is performed. Information extraction refers to the extraction of many concepts from a message as well as any URL-linked pages contained in the message. Here a concept refers to a property of the event-object e.g., time-of-occurrence of event, location, factory-info etc described in the 'Event Structure' section here below:

Event Structure: An event of interest can be an accident, a sports event, a marketing event or a cultural program. Different sets of properties are required to represent each such event-type. However, for information extraction and subsequent analysis it is desirable to use a common scheme for representing events. Properties representing an event are classified into 4 broad categories namely temporal, generative, spatial and descriptive; these are referred to as aspects of an event. The Table 1 below shows a sample event.

Properties in temporal aspect capture the time of occurrence of an event, duration of the event etc. Properties in the generative aspect represent source information, e.g., Tweeter-ID, time of tweet, tweet-text etc. Similarly, the spatial aspect contains properties pertaining to location sense and descriptive aspect will contain properties that convey semantic information about the event, e.g., event-type (i.e., 'fire-in-factory', 'labour-strike' etc). Temporal and generative aspects are observed to share common properties across event-types. However spatial aspects can be absent from some events such as global product-promotions and product launches. Spatial aspects can have additional properties for natural-calamities (e.g. earthquake, flood etc), e.g., geographical-spread of the earthquake or flood which would typically define a spatial region. Properties that are common across event-types are modeled explicitly and others that are specific to event-type are stored as key-value pairs since the key names changed for such properties based on event-type.

TABLE 1

| Temporal aspects | Descriptive aspects |
| --- | --- |
| Time of Event Start: 16 Jun. 2011<br>End of Event: 16 Jun. 2011<br>Event duration: 1 day | Event-Type: Fire-in-Factory<br>Factory Info: a NXXXX factory<br>Number of people killed in the fire: 0 |
| Spatial aspects | Generative aspects |
| Street Address:<br>City/County: madras, chennai<br>State: tamil nadu<br>Country: India<br>Lattitude and longitude:<br>13.09, 80.27 | Tweeters ID: @mullyspeak<br>Related Tweet: 1 |

Twitter messages do not usually follow the rules of English grammar and therefore information extraction from these still remains challenging. The present invention applies modifications to the standard techniques of NLP-based information extraction, and explores four techniques of information extraction:
(i) Regular expressions, (ii) Concept vocabulary based extraction (iii) Named Entity Recognition (NER) (iv) POS Tagger+ Regular Expression Most of the properties of the Generative aspect can be extracted using regular-expressions from the meta-data obtained along with every tweet. The limitation of this approach is that it may require rewriting the regular expressions whenever the Twitter service API is upgraded. However if intelligently written such a procedure can be fairly stable. Usually the messages themselves do not contain any information on temporal aspects unless otherwise it is a nontrivial characteristic of the event. The time of creation of the first tweet reporting an event is found to be a fair approximation of actual time of occurrence of the event, and therefore it is employed as an effective approach in the present invention instead of extracting any temporal aspects, from the message itself.

In one of the embodiments of the invention, it is desirable to extract name or domain of the organization hit by an event such as fire-in-factory or labor-strike. It is found that Named Entity Recognition (NER) mostly fails to annotate factory name correctly. This is not only because rules of English grammar are not followed in the messages, but also because people resort to describing the domain of operation of the manufacturing unit than their popular name e.g. "huge fire breaks out in a cotton factory in". Therefore, the present invention employs a POS Tagger, followed by regular expression filters. POS Tagger is employed for every message and then tree traversal is performed to identify phrases. Traversal is performed upwards from any of leaf node having words {"factory", "mill", "plant"}, until the parent tag continues to be NP (proper-noun). Words under such a sub tree are taken as a potential phrase representing factory-info. In this phrase words appearing before first DT (article) tag on left of {"factory", "mill", "plant"} are removed. Remaining phrase is taken to be factory-information. As a test, both of the approaches described above are executed on a set of 300 tweets, all of which contained factory-info. NER could extract organization name from 1% of the tweets while the present approach extracted factory information from 78% of the tweets.

For location extraction from the tweets, a mix of two techniques is employed which complement each other. The first is NER which labels sequences of words in a text that is likely to be names of person, location, organization etc, using CRF sequence models. The second approach makes use of a Naive Bayes Classifier, called as 'Concept vocabulary based extraction'. Similar techniques have been used in the field of natural language processing and information extraction.

Concept vocabulary based extraction: This is broadly a two step process. In the first step Potential Concept-Word Annotation the potential words that may belong to the concept are identified. This also involves grouping the words into phrases. This is achieved by taking the concept-vocabulary, i.e., a list of all location names in the world (using World Gazetteer data, and generating a directed-cyclic graph from it. In this graph a node refers to every word which could potentially denote a location and an edge is created between two nodes if these two words in sequence denote a location name or part of the location name. Then search for every word of a tweet in the hash-map of nodes of above graph which in turn assisted in annotating some words/phrases as potential location.

It is not certain that these words/phrases have been used in the same sense as the target concept (location) e.g. "Friday Harbor" is a place and the word Friday could be used in a text to indicate day of the week. The second step in Concept vocabulary based extraction is to find out that whether the potential-locations used in the text, denote a location. For this Naive Bayes Classifier is used which classifies the potential-locations into one of two categories—'location' and 'non-location'. From every tweet, the POS Tag of 7 words/phrases is taken as a feature. These 7 words/phrases comprised of 3 words before the potential-location, the potential-location itself and 3 words after potential-location. A sample feature is 'neg-3-VB' indicating occurrence of a verb in '-3' position, with respect to potential-location. (Each tweet can contain 7 features only.) Using Concept vocabulary based extraction location in 74% of the tweets can be identified while using NER location in 70% of the tweets is identified. Even if a location is identified by either of the techniques, it is assumed to be true. Therefore the two approaches complement each-other. The combined throughput of the two techniques is found to be 78%.

The other embodiment of the present invention presents a situation where once the locations have been identified from tweets of an event, some of these locations are different, and some of them are not locations but wrongly tagged as location. For better clarity and further reasoning on the event-objects it is important to know place of occurrence of events with complete details including, State, Country etc. In one other embodiment, the present invention attempts to obtain longitude and latitude of these locations. Finally, many different places in the world share the same name calling for disambiguation.

In an alternate embodiment, the present invention derived an approach for semantic analysis and disambiguation of location information using World Gazetteer data, inverted-index search, and Google Maps API. An inverted-text-index using the Apache open-source package Lucene, on the World Gazetter data, which contains longitude, latitude along with country-name and state-name of every location in the world is created. If there is only one location extracted for an event and is searched for in the index it has only one hit, it is possible to find all the details about the place along with its longitude and latitude. If that location is not available in the index, then search for it using the Google-Maps API; the first hit in the search results is taken to be the place that location-phrase is referring to. When multiple locations are extracted for the same event, and all these are found in inverted-text-index also, a check is made as to how many of them are very closely related or overlap. The place having maximum overlap is taken to be the event location i.e. if the word 'York' and 'UK' both occur, they are found to be overlapping (using spatial analysis, i.e., considering their longitude and latitude) and 'York, UK' is chosen instead of choosing 'New York' from the top search results based on the word 'York'. However if sufficient information is not available in the text it becomes challenging to identify which of the similarly named location does this message refer to e.g. If only 'London' is mentioned, it cannot be conclusively stated which of the places that are named as London, does this word refer to. For such situations a set of precedence rules is followed, the order of precedence being: Continent, Country, Country-Capital, State, State-Capital, City, Locality etc. or simply stated, precedence based on the size of the location.

Event-To-Event Correlation:

Partial-events identified in prior steps will also contain structured information about events such as the time of occurrence of an event, place of event, etc., as derived by the information extraction techniques described above. In the previous correlation step, the tweets are correlated based on word-to-word similarity, therefore tweets that describe different aspect of events, or the tweets that merely describe the event in different words, would not have got clubbed. Therefore many of the partial-events still refer to the same real world event.

One of the embodiments of the present invention presents an approach for correlating such events based on semantic information of those events, i.e., event-type, time of occurrence, place of occurrence and factory info, by a semantic correlation module 101(d) so as to obtain a final and unique event-object. Two partial-events will belong to the same real world event when their context, location, time window and certain descriptive properties match. A simple string match for event-location would not work because users can use different levels of granularity to describe the event-location. For example one set of tweets stating 'London' and another set of tweets stating 'Bromley' (Bromley is a district in London, UK). Similarly, time of occurrence, which has been taken as the time of first tweet of partial-events, may not match even for the partial-events that belong to same real world event. Moreover a brute force method would compare an event with every other event with time-complexity $O(n^2)$. A better way is to search for matches in the event's neighborhood with respect to time and location. Neighborhood search is implemented by maintaining an in-memory index of the events. For every new event created or modified, their spatial and temporal attributes are updated in the index. From this index one can define a neighborhood of potential matches for an event. The neighborhood is calculated with the distance measure described as below. The event is then compared with each of its neighbors for a match. The neighborhood of an event includes all the events with the same context having event-locating within a 100 kms radius and happened within 24-hour time window of the event. The event is compared with each of its neighbors for matches in descriptive and generative aspects. For example in Fire-in-a-factory context, the factory information is compared for a match. Most of tweets belonging to an event carry the URL of the news article's webpage. When events contain the same URL, they are merged together. For generating the neighborhood of an event as defined above, Lucene's spatial index for event location and Luene's range search for event-time is used. The Event-to-Event Correlation step results in unique and consolidated event-objects which are then stored in a relational database for further analysis.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. The listing of steps within method claims do not imply any, particular order to performing the steps, unless explicitly stated in the claim.

Referring to FIG. 4, a 'Real Time Event Viewer' using the aforementioned techniques has been depicted. It shows newer events as they are reported and detected by the present system framework in real-time and provides a user interface for users to provide feedback on whether each event is real or not. The continuous feedback provided by users is utilized to augment the training set via a boosting process resulting in continuous learning.

Figure 5:
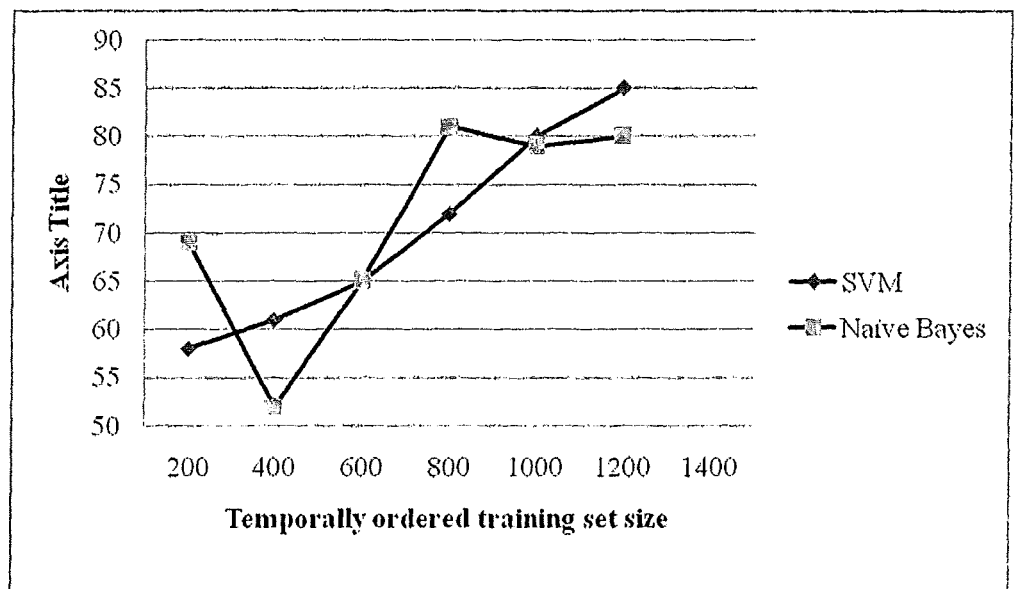
FIGS. 5 (a) and (b) is a graphical representation of comparative analysis conducted for classifiers in accordance with one of the disclosed embodiments of the present invention.
Figure 5:
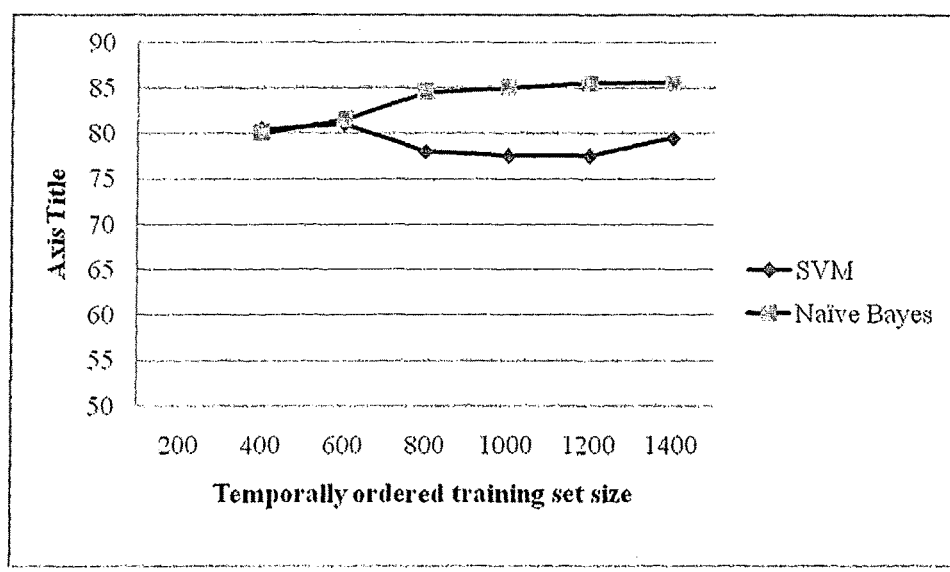

Experiments conducted for realizing the present invention are performed on 5 million tweets collected over a period of almost 9 months for fire-in-factory events and about 3 million tweets obtained for Labor-Strike events. The tweets are manually tagged and events detected for a period of initial 3 months and first fortnight. Therefore the results presented on detection, refer to this period only. To analyze the effectiveness of classification techniques for event detection, using the same set of features, these manually tagged tweets (post filtering) are chosen in chronological order as they occurred in Twitter over 3 months. Starting with first 200 tweets as training set, the next 200 tweets are classified; then for next run all these 400 tweets are taken as training set, with next incoming 200 as test set, and so on (i.e., the test data is always 200 tweets, albeit different ones for each data point). Results of this measurement are shown in FIG. 5 (a).

Figure 6:
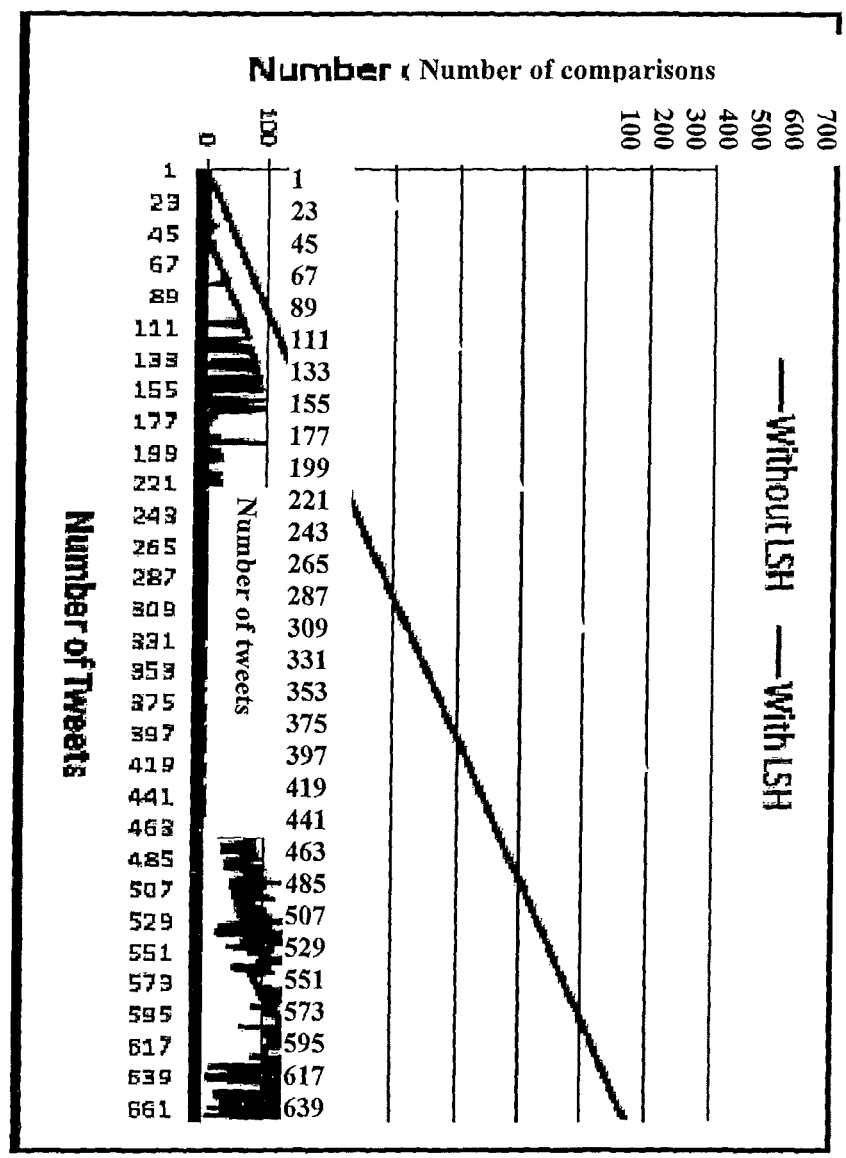
FIG. 6 is a graphical representation of comparative study done for various correlating techniques, in accordance with one of the disclosed embodiments of the present invention.

As is evident, accuracies improve with continuous boosting as incorrectly classified tweets are manually corrected and incorporated in the training set to classify subsequent incoming tweets. The accuracies in the range of 80% with both Naive Bayes as well as SVM are achieved. However, it is seen that Naive Bayes does better. Next the training data collected for a definite period on a fixed set test set of 250 filtered tweets is used. The results for different training-set sizes are shown in FIG. 5(b). Once more, similar accuracies are achieved in the 77-85% range, with Naive. Bayes out performing SVM. Thus, it is concluded that the classifier based on a few month's training data works equally well even on tweets far into the future, at least for Fire-in-Factory events. (Similar results are observed for Labour-Strike events, albeit with lower accuracies in the 60-65% range, which can though be improvised.) Last but not the least, it is important to note that even with the moderate 80%-level classification accuracies, it is observed that, as also reported in the Detection Section, the present system hardly ever missed a real-world factory-fire event that could have affected an enterprise's supply-chain, unless no pertinent information about the event is actually contained in the message. To assess the performance gain due to LSH, the average size of potentially matching tweets set is measured. For a continuous run of the system for about 8 days, the number of tweets that an incoming tweet is compared with is measured. This data plotted on a line-graph is shown in FIG. 6. As shown, the typical size of potentially matching tweets set is 20% of total number of tweets in all the buckets, therefore the incoming tweet is compared with only 20% of the tweets instead of all.

Finally, to ensure uniqueness of the event-objects, a sample of events collected for a continuous run of 11 days is analyzed. It is found that 23.4% of the events are duplicate or alluding to same real-world event and should therefore have been merged. So it is established that the present approach of message-to-message correlation coupled with event-to-event correlation gives 76.6% accuracy.

It is therefore shown that event correlation is a two step process, first at the raw message level and then through semantic analysis of events. For detection of relevant tweets it is shown that the present invention using supervised classification of individual tweets is able to catch the sparsely reported events, in the long-tail'. There is also improvised standard NLP techniques so that they work on the informal language often used in Twitter. Finally all the performance results so presented embolden the present event-object creating architecture.

We claim:

1. A computer implemented method of deriving at least one structured event object from a stream of unstructured text associated with a plurality of sparsely reported events, comprising:

detecting one or more potential events in steps of:
  a) filtering the unstructured text following a specific pattern using a regular expression filter, and
  b) classifying, using a supervised classifier, the filtered text based upon a set of recognized features;
  computing a textual similarity score for incoming text stream by comparing each of the incoming text stream with potentially matching neighboring text stream for textual similarity, and
  dynamically creating a bucket for the incoming text stream upon determining lowest hash values for the incoming text stream and identifying unique combination of the lowest hash values, wherein the potentially matching neighboring text stream corresponds to text streams sharing dynamically created bucket;
  establishing a correlation, whenever the textual similarity score is above a predetermined threshold score for obtaining one or more partial events that correspond to text streams in the created bucket;

extracting conceptual and other related information from the correlated partial events and associated metadata; and deriving the at least one structured event object by establishing a correlation between the partial events based on the extracted conceptual and other information of the corresponding partial events.

2. The method of claim 1, wherein the unstructured text refers to informal and abbreviated language used across a plurality of social networking platforms, and wherein the unstructured text reporting occurrence of an event-of-interest is classified as the potential event associated text.

3. The method of claim 1, wherein the filtered text is classified using Naïve-Bayes-Classifier, Support Vector Machine or a combination of the Naïve-Bayes-Classifier, the Support Vector Machine, and wherein the recognized features classifying the filtered text comprises occurrence of location, organization or resources; occurrence of numbers within the text along with a range identified for each number, each word; and not limited to the text obtained upon removal of pre-configured stop words from the text.

4. The method of claim 1, wherein the correlation between the classified texts is established by Locality Sensitive Hashing technique.

5. The method of claim 1, wherein the correlation is established between the incoming text stream and the potentially matching text stream whenever the textual similarity score exceeds a threshold score determined to be in the range from 55% to 75%.

6. The method of claim 1, wherein the conceptual information includes event temporal aspects comprising event start time, event end time, and event duration; event spatial aspects comprising address with names of street, city, country along with latitudinal and longitudinal coordinates; event descriptive aspects comprising event type, event subject information and associated statistics; and event generative aspects comprising source details of information provider, wherein:

the other related information includes URL-linked pages contained within the text stream of specific event type.

7. The method of claim 6, wherein the generative aspects are extracted using regular expressions from the associated metadata of the text stream; the descriptive aspects are extracted using POS tagger followed by regular expression approach; the temporal aspects are determined based on the time of reporting of the first potential event; and the spatial aspects are extracted using a combination of Named Entity Recognition approach and Concept Vocabulary based extraction approach.

8. The method of claim 1, wherein for the spatial aspects determined as conflicting, semantic analysis approach in combination with searches across World Gazetter data, inverted index searches, and Google Maps API is applied.

9. The method of claim 1, wherein for insufficient information contained in the text stream, spatial aspects are extracted by following a set of precedence rules, order of the precedence being Continent name, Country, Country-Capital, State, State-Capital, City, Locality and following street details.

10. The method of claim 1, wherein semantic correlation is established between one or more partial events based on extracted conceptual information.

11. The method of claim 1, wherein the event to event correlation is further derived from conceptual information including temporal aspects, generative aspects, descriptive aspects and spatial aspects of other events occurring in the close vicinity and within predestined time interval of the event specific to the event type.

12. The method of claim 11, wherein the close vicinity corresponds to not more than 100 km radius and the predestined time interval is not more than 24 hours.

13. A computing system to derive at least one structured event object from a stream of unstructured text associated with plurality of sparsely reported events, comprising:

a processor, and a memory device coupled to the processor and configured to provide the processor with instructions, the instructions being executable by modules hosted on the processor, the modules including:

a detection module configured to detect one or more potential events in steps of: a) filtering unstructured text following a specific pattern using regular expression filter, and b) classifying, using a supervised classifier, the filtered text based upon a set of recognized features, to get electronically transmitted to a correlation module;

the correlation module configured to:

dynamically create a bucket for the incoming text stream upon determining lowest hash values for the incoming text stream and identifying unique combination of the lowest hash values, wherein the potentially matching neighboring text stream corresponds to text streams sharing dynamically created bucket;

generate one or more partial events by establishing correlation between the classified text bearing textual similarity, which remains communicably connected to an information extraction module that is configured to extract one or more semantic properties of the one or more partial events that correspond to text streams in the created bucket; and a semantic correlation module being responsively connected to an information extraction module to establish correlation between the partial events and obtaining at least one structured event object based on conceptual and other associated information extracted by the information module from the one or more partial events and associated metadata.

14. The system of claim 13, further comprising a display unit configured to present a real time view of the structured event objects and configured to receive user inputs on the event object information presentation to augment following stream of unstructured text via boosting process.

* * * * *